(12) United States Patent
Gee et al.

(10) Patent No.: US 8,502,654 B2
(45) Date of Patent: Aug. 6, 2013

(54) VEHICLE INFORMATION DISPLAY AND METHOD

(75) Inventors: Thomas Scott Gee, Canton, MI (US); Paul Stephen Bryan, Belleville, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 802 days.

(21) Appl. No.: 12/725,535

(22) Filed: Mar. 17, 2010

(65) Prior Publication Data

US 2011/0227715 A1 Sep. 22, 2011

(51) Int. Cl.
*B60Q 1/00* (2006.01)
(52) U.S. Cl.
USPC ............................ 340/439; 180/284; 701/123
(58) Field of Classification Search
USPC .................... 340/439, 438; 180/284; 701/123
See application file for complete search history.

(56) References Cited

U.S. PATENT DOCUMENTS

| | | | | |
|---|---|---|---|---|
| 4,313,080 A | * | 1/1982 | Park ................................ 320/123 |
| 4,475,380 A | * | 10/1984 | Colovas et al. ............ 73/114.53 |
| 4,570,226 A | * | 2/1986 | Aussedat ...................... 701/123 |
| 4,706,083 A | * | 11/1987 | Baatz et al. ................... 701/123 |
| 4,845,630 A | * | 7/1989 | Stephens ....................... 701/123 |
| 4,970,492 A | * | 11/1990 | King .......................... 340/450.3 |
| 5,693,876 A | * | 12/1997 | Ghitea et al. .............. 73/114.53 |
| 5,758,299 A | * | 5/1998 | Sandborg et al. ............ 701/33.7 |
| 5,978,729 A | * | 11/1999 | Landes et al. ................. 701/115 |
| 6,092,021 A | * | 7/2000 | Ehlbeck et al. ............... 701/123 |
| 6,366,848 B1 | * | 4/2002 | Gustavsson ................... 701/123 |
| 6,600,413 B1 | * | 7/2003 | Lo ................................. 340/439 |
| 6,601,442 B1 | * | 8/2003 | Decker et al. .............. 73/114.15 |
| 6,985,804 B2 | * | 1/2006 | Minami ........................... 701/64 |
| 7,024,306 B2 | * | 4/2006 | Minami et al. ................ 701/123 |
| 7,487,757 B2 | * | 2/2009 | Radovanovic et al. ....... 123/357 |
| 7,769,499 B2 | * | 8/2010 | McQuade et al. ................. 701/1 |
| 8,068,974 B2 | * | 11/2011 | Newhouse et al. ........... 701/123 |
| 8,082,774 B2 | * | 12/2011 | Watson et al. ............. 73/114.54 |
| 8,116,971 B2 | * | 2/2012 | Chen et al. .................... 701/123 |
| 2002/0171541 A1 | * | 11/2002 | Crombez et al. ............. 340/461 |
| 2005/0021222 A1 | * | 1/2005 | Minami et al. ................ 701/123 |
| 2005/0128065 A1 | * | 6/2005 | Kolpasky et al. ............. 340/461 |
| 2006/0109097 A1 | * | 5/2006 | Grill et al. ..................... 340/439 |
| 2007/0001831 A1 | * | 1/2007 | Raz et al. ...................... 340/439 |
| 2007/0013498 A1 | * | 1/2007 | Knoll et al. ................... 340/438 |
| 2007/0143002 A1 | * | 6/2007 | Crowell et al. ............... 701/123 |
| 2007/0247291 A1 | * | 10/2007 | Masuda et al. ................ 340/439 |
| 2011/0090075 A1 | * | 4/2011 | Armitage et al. ............. 340/439 |
| 2011/0205043 A1 | * | 8/2011 | Fujiki et al. ................... 340/439 |
| 2011/0205044 A1 | * | 8/2011 | Enomoto et al. ............. 340/439 |
| 2011/0210838 A1 | * | 9/2011 | Fujiki et al. ................... 340/439 |
| 2011/0241864 A1 | * | 10/2011 | Fujiki et al. ................... 340/439 |

* cited by examiner

OTHER PUBLICATIONS

Jalopnik, 2010 Honda Insight Ecological Drive Assist System Grows Leaves, Gets Other Features, http://jalopnik.com/5094111/2010-honda-insight-ecological-drive-assist-system-grows-leaves-gets-other-features, Nov. 20, 2008, pp. 1-3.

*Primary Examiner* — Jennifer Mehmood
*Assistant Examiner* — Rufus Point
(74) *Attorney, Agent, or Firm* — Jennifer M. Stec; Brooks Kushman P.C.

(57) ABSTRACT

An information display system includes an information display that communicates relevant information relating to the operation of a vehicle. The information display conveys a score representing lifetime or long-term driving or operating efficiency of the vehicle. The score can be conveyed numerically or graphically using a number of indicators, or both. Each indicator may correspond to a different achievement level attained for efficient driving or vehicle use behavior.

20 Claims, 3 Drawing Sheets

VEHICLE INFORMATION DISPLAY AND METHOD

TECHNICAL FIELD

The present application relates to an information display system and method for displaying efficient driving achievement information relating to the operation of a vehicle.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help drivers to better learn the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Displaying certain types of information, particularly information relevant to HEVs, PHEVs or BEVs, can help facilitate economical driving choices.

SUMMARY

According to an embodiment of the present application, an information display system for a vehicle may include an information display for displaying an economy level score and a controller in communication with the information display. The controller may determine a point score based on an energy consumption rate, determine whether the point score exceeds a level promotion threshold, and increment the economy level score upon a determination that the point score exceeds the level promotion threshold. The information display may include one or more economy level indicators corresponding to the economy level score. The economy level score may be displayed on the information display using the one or more economy level indicators. The economy level score may be incremented by transmitting a command signal so that an additional economy level indicator is added to the information display. Additionally, the controller may determine the point score based on the energy consumption rate upon a determination that the energy consumption rate is less than a first efficiency threshold.

Determining a point score based on an energy consumption rate may include determining a point score increment amount based on the energy consumption rate and increasing the point score by the point score increment amount. Moreover, the level promotion threshold may be determined based on the economy level score. Further, an amount of additional points necessary for the point score to exceed a next level promotion threshold may be greater than the amount of additional points required for the point score to exceed a preceding level promotion threshold. Additionally, the display of the economy level score may be hidden from a driver until the point score exceeds a first level promotion threshold. Furthermore, the economy level score may be based on the number of level promotion thresholds exceeded over a life of the vehicle.

Similarly, determining a point score based on an energy consumption rate may include determining whether the energy consumption rate exceeds a second efficiency threshold, determining a point score decrement amount based on the energy consumption rate upon a determination that the energy consumption rate exceeds the second efficiency threshold, and decreasing the point score by the point score decrement amount. The controller may also determine a level demotion threshold based on the economy level score, determine whether the point score drops below the level demotion threshold, and decrement the economy level score upon a determination that the point score dropped below the level demotion threshold.

The number of economy level indicators may be arranged non-linearly on the information display. Further, the economy level indicators may be displayed randomly on the information display. Alternatively, the economy level indicators may be displayed in a predetermined order on the information display.

According to another embodiment of the present application, a method for displaying information relating to the operation of a vehicle on an information display may include determining a point score increment amount based on an energy consumption rate and increasing a point score by the point score increment amount. The method may further include determining whether the point score exceeds a level promotion threshold, incrementing an economy level score upon a determination that the point score exceeds the level promotion threshold, and displaying the economy level score on the information display. Moreover, the method may include determining a next level promotion threshold based on the economy level score. An amount of additional points necessary for the point score to exceed the next level promotion threshold may be greater than the amount of additional points required for the point score to exceed a preceding level promotion threshold.

Similarly, the method may include determining a point score decrement amount based on the energy consumption rate and decreasing the point score by the point score decrement amount. The method may further include determining a level demotion threshold based on the economy level score, determining whether the point score drops below the level demotion threshold, and decrementing the economy level score upon a determination that the point score dropped below the level demotion threshold.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
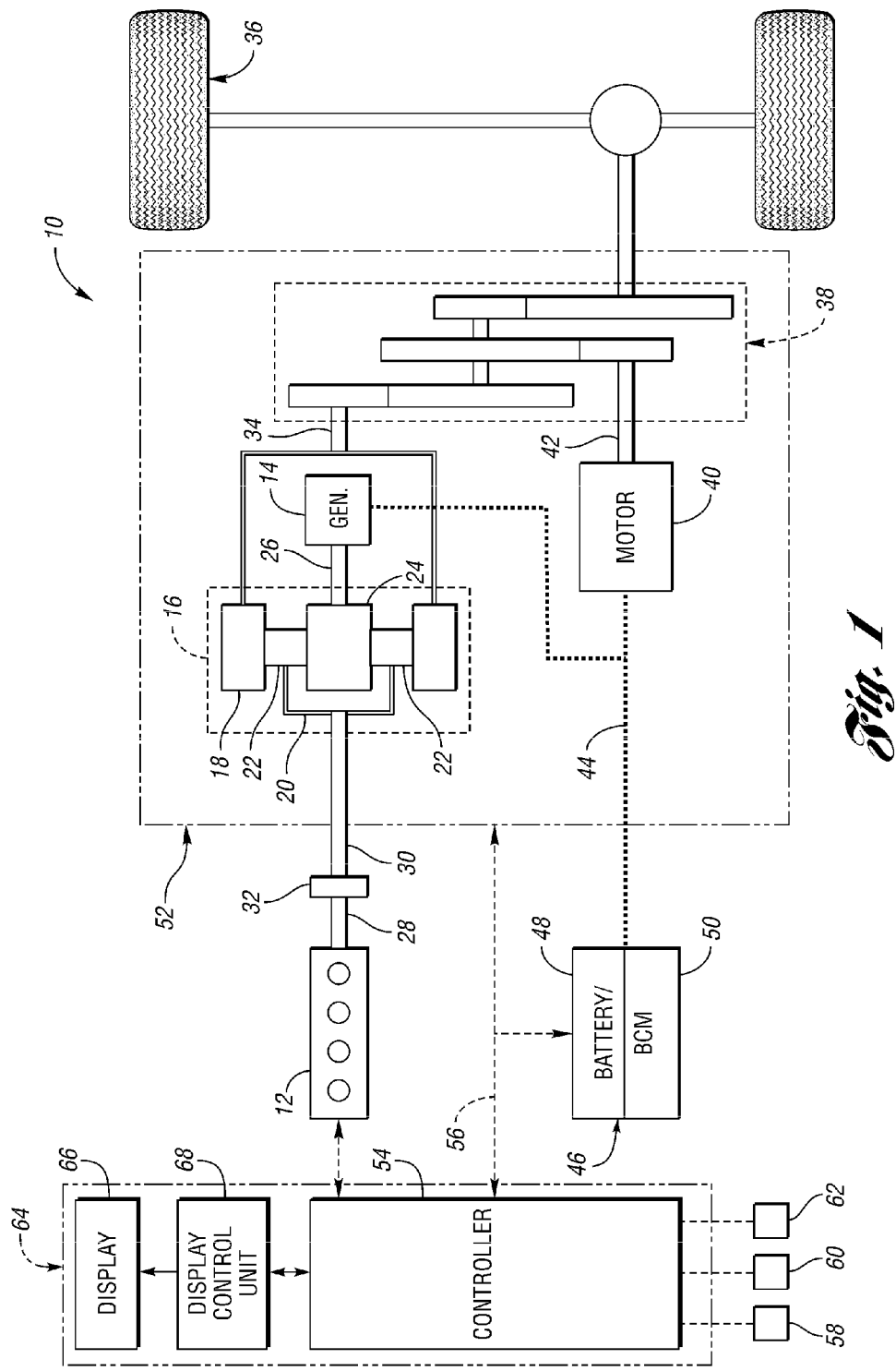
FIG. 1 is a simplified, exemplary schematic representation of a hybrid electric vehicle (HEV) including an information display system according to one or more embodiments of the present application.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as vehicle controller 54, may be provided. Although it is shown as a single controller, it may include multiple controllers that may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as those powered by an internal combustion engine alone, electric motor alone or a fuel cell.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, may communicate with the controller 54. The air conditioning system 62 may also communicate with the controller 54. The on/off status of the air conditioning system can be communicated to the controller 54, and can be based on, for example, the status of an operator actuated switch, or the automatic control of the air conditioning system 62 based on related functions such as window defrost.

In addition to the foregoing, the vehicle 10 may include an information display system 64, which, as explained in detail below, can provide relevant vehicle content to the driver of the vehicle 10. As shown in FIG. 1, the information display system may include the controller 54 and an information display 66. The information display system 64 may also include its own control system, which, for reference purposes, may be a display control unit 68. The display control unit 68 may communicate with the controller 54 and may perform control functions on the information display 66, although the controller 54 may also function as the information display's control system. The controller 54 may be configured to receive input that relates to current operating conditions of the vehicle 10, and the controller 54 may provide output to the display control unit 68 such that the information display 66 conveys driving efficiency information or other information relating to the operation of the vehicle 10 to the driver.

The information display 66 may be disposed within a dashboard (not shown) of the vehicle 10, such as in an instrument panel or center console area. Moreover, the information display 66 may be part of another display system, such as a navigation display system, or may be part of a dedicated information display system. The information display 66 may be a liquid crystal display (LCD), a plasma display, an organic light emitting display (OLED), or any other suitable display. The information display 66 may include a touch screen for receiving driver input associated with selected areas of the information display 66. The information display system 64 may also include one or more buttons (not shown), including hard keys or soft keys, located adjacent the information display 66 for effectuating driver input. Other operator inputs known to one of ordinary skill in the art may also be employed without departing from the scope of the present application.

Figure 2A:
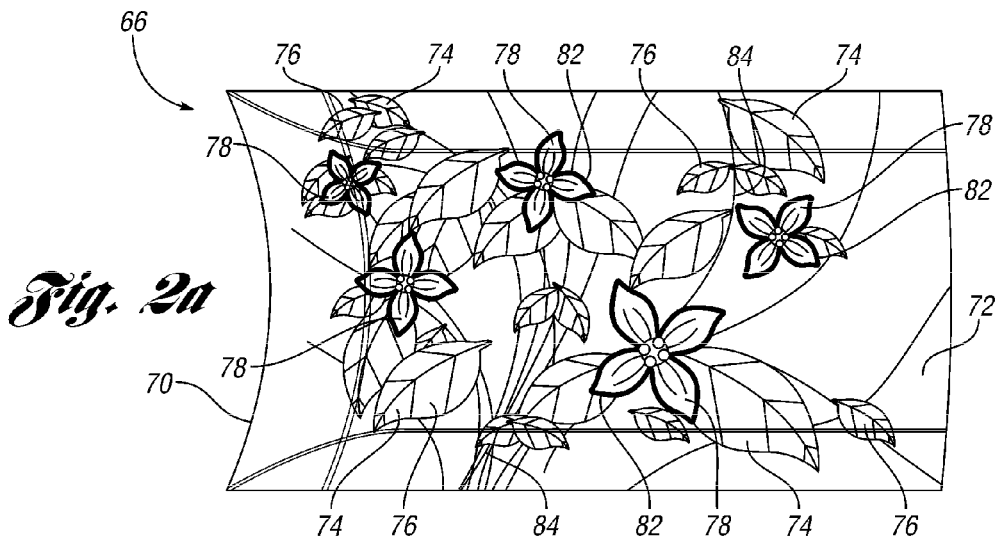
FIG. 2a depicts an exemplary information display according to one or more embodiments of the present application.
Figure 2B:
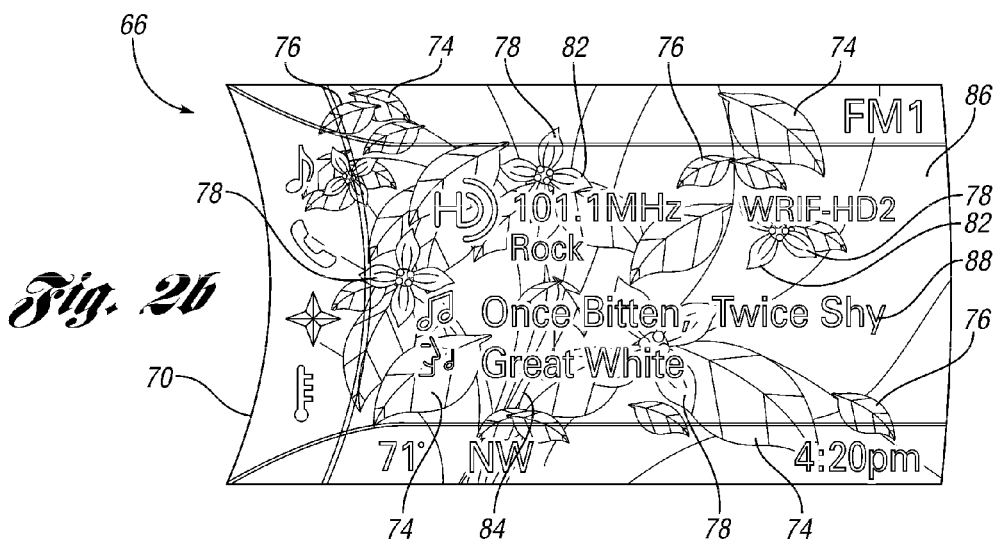
FIG. 2b depicts another exemplary information display according to one or more embodiments of the present application.
Figure 2C:
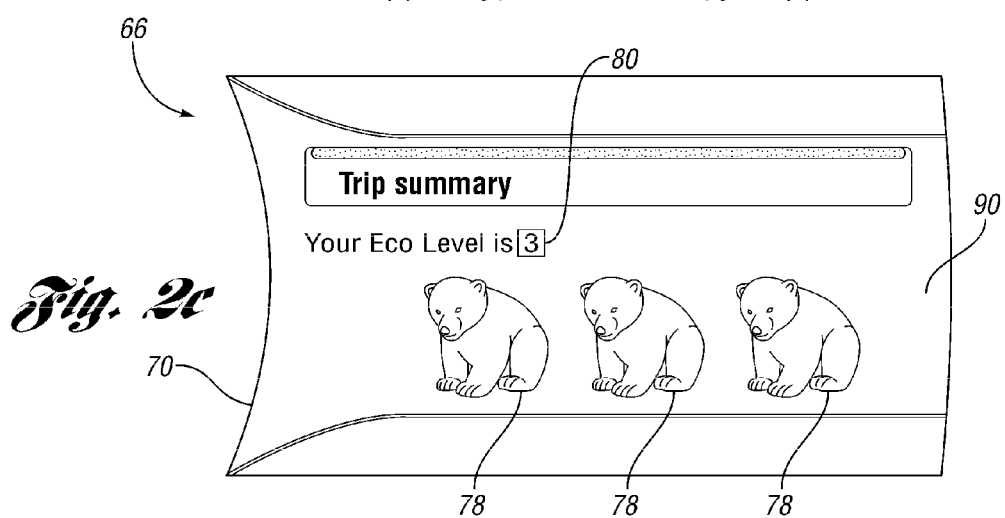
FIG. 2c depicts yet another exemplary information display according to one or more embodiments of the present application.

Referring generally to FIGS. 2a-c, the information display 66 is shown in greater detail in accordance with one or more embodiments of the present application. As seen therein, the information display 66 may display one or more display screens 70 that may change to convey different information to the driver. To that end, the one or more display screens 70 may be selectable or non-selectable and may transition upon receipt of driver or vehicle input at the display control unit 68.

As shown in FIG. 2a, the information display 66 may include an efficiency screen 72. The operating efficiency of the vehicle 10 may be displayed using one or more efficiency indicators 74. The information display 66 may convey to the driver when the vehicle 10 is operating more efficiently by increasing the number of efficiency indicators displayed. For example, if a particular vehicle operation results in increased efficiency, the information display 66 may display more efficiency indicators 74, thereby informing the driver of the improved vehicle operation. Conversely, if the vehicle 10 is operated in an inefficient manner, the number of efficiency indicators 74 displayed on the information display 66 may be reduced. As such, the information display system 64 may aid the driver in modifying operation of the vehicle 10 in order to acquire optimal efficiency.

According to one or more embodiments of the present application, the one or more efficiency indicators 74 may generally correspond to the efficiency of the vehicle 10 over a relatively short period of time, such as a trip or current drive cycle. While the efficiency indicators 74 illustrated in FIG. 2a are represented as leaves 76, one skilled in the art would understand that other efficiency indicators may be displayed without departing from the scope of the present application.

Additionally or alternatively, the information display 66 may display additional feedback in the form of one or more economy level indicators 78. The one or more economy level indicators 78 may symbolize an economy level score 80 (displayed numerically in FIG. 2c). The economy level score 80 may correspond to achievements the driver can earn over time, distance, or some other predetermined measure, based on economical or efficient driving behavior. To this end, the economy level score 80 may also provide an additional incentive to efficient driving and vehicle use behavior, as well as encourage the driver to remain engaged with the vehicle 10 long after the initial excitement of owning or operating the vehicle fades.

The economy level score 80 may be displayed in any number of ways without departing from the scope of the present application. For instance, the economy level score 80 may be displayed numerically and/or graphically using symbols, images, or the like. As shown in FIG. 2a, the economy level score 80 may be displayed using the one or more economy level indicators 78. The economy level indicators 78 may be images such as flowers, trees, animals, or the like, or may include portions thereof. As also shown in FIG. 2a, the one or more economy level indicators 78 may be flowers 82 or portions of a flower growing on vines 84 alongside the efficiency indicators 74. In this regard, the economy level indicators 78 may be displayed in a non-linear arrangement on the information display 66.

Although displayed non-linearly, the economy level indicators 78 may be displayed in a predetermined order on the information display 66. That is, each economy level indicator 78 may be revealed on the information display 66 in a predefined order. Alternative, the economy level indicators 78 may be displayed or revealed in a random pattern across the information display 66. According to one or more embodiments, the number of economy level indicators 78 displayed on the information display 66 may correspond to the numerical value of the economy level score 80. Accordingly, the presence of three economy level indicators, for example, may symbolize an economy level score of three. As the economy level score 80 changes, so too does the number of economy level indicators 78.

In the exemplary embodiment shown in FIG. 2a, the economy level score 80 is conveyed using the one or more economy level indicators 78 displayed amongst the one or more efficiency indicators 74. Of course, the economy level score 80 may be displayed without the presence of the efficiency indicators 74. As previously described, the one or more efficiency indicators 74 may correspond generally to trip efficiency. In contrast, the economy level score 80 may correspond generally to an overall driving or operating efficiency for the life of the vehicle 10. However, it should be noted that the driver or operator of the vehicle 10 may have the option to reset the economy level score 80 similar to resetting the lifetime fuel economy for a vehicle equipped with an internal combustion engine. Moreover, the information display system 64 may provide the driver or operator the option to turn off the economy level score function. Thus, the economy level score 80 may be selectively displayed.

Additionally, the economy level score 80 may be displayed on the information display 66 while the vehicle 10 is being driven, for example, using the one or more economy level indicators 78. Moreover, the driver may be able to elect whether the economy level score 80 is displayed while driving and, if so, how the economy level score is displayed. Further, the economy level score 80 may be displayed on the information display 66 as a background or wallpaper. For example, as shown in FIG. 2b, the economy level score 80 may be communicated using the one or more economy level indicators 78 displayed in a background 86 of the information display 66 while other information is displayed in a foreground 88 (e.g., the time, temperature, stereo settings, a compass, a menu, or the like). As the information displayed in the foreground 88 of the information display 66 changes, the economy level indicators 78 and/or efficiency indicators 74 may continue to be displayed in the background 86.

Referring now to FIG. 2c, the economy level score 80 may also be displayed for a period of time at vehicle shutdown. For instance, the economy level score 80 may be displayed on a trip summary screen 90 that appears when the vehicle 10 is turned off. Again, the economy level score 80 may correspond to a lifetime achievement level as defined by the number of achievements earned for efficient operation over the life of the vehicle 10. Moreover, the economy level score 80 may be displayed using images, numbers, symbols, or a combination thereof. As shown in FIG. 2c, the economy level score 80 may be displayed on the information display 66 both numerically and graphically using one or more economy level indicators 78. In the example provided by FIG. 2c, each economy level indicator 78 may be an image of an animal, although any number of images may be suitable to convey the economy level score.

According to one or more embodiments of the present application, the economy level score 80 and/or the corresponding economy level indicators 78 may not be displayed at any time when the economy level score is zero. In this regard, the driver may be unaware of such a feature as the economy level score until a first achievement level is attained. Thus, the economy level score feature for the vehicle 10 may be a hidden feature (i.e., a virtual Easter egg) that does not appear or become otherwise active until the first achievement is awarded.

The economy level score 80 may be calculated in a number of ways. In each instance, the economy level score 80 may correspond to a current achievement level attained by the driver as defined by the number of achievements earned over time or distance traveled, or some other measure. For example, as each achievement is awarded for efficient driving behavior or vehicle operation, a new achievement level is reached and the economy level score 80 is appropriately incremented.

Figure 3:
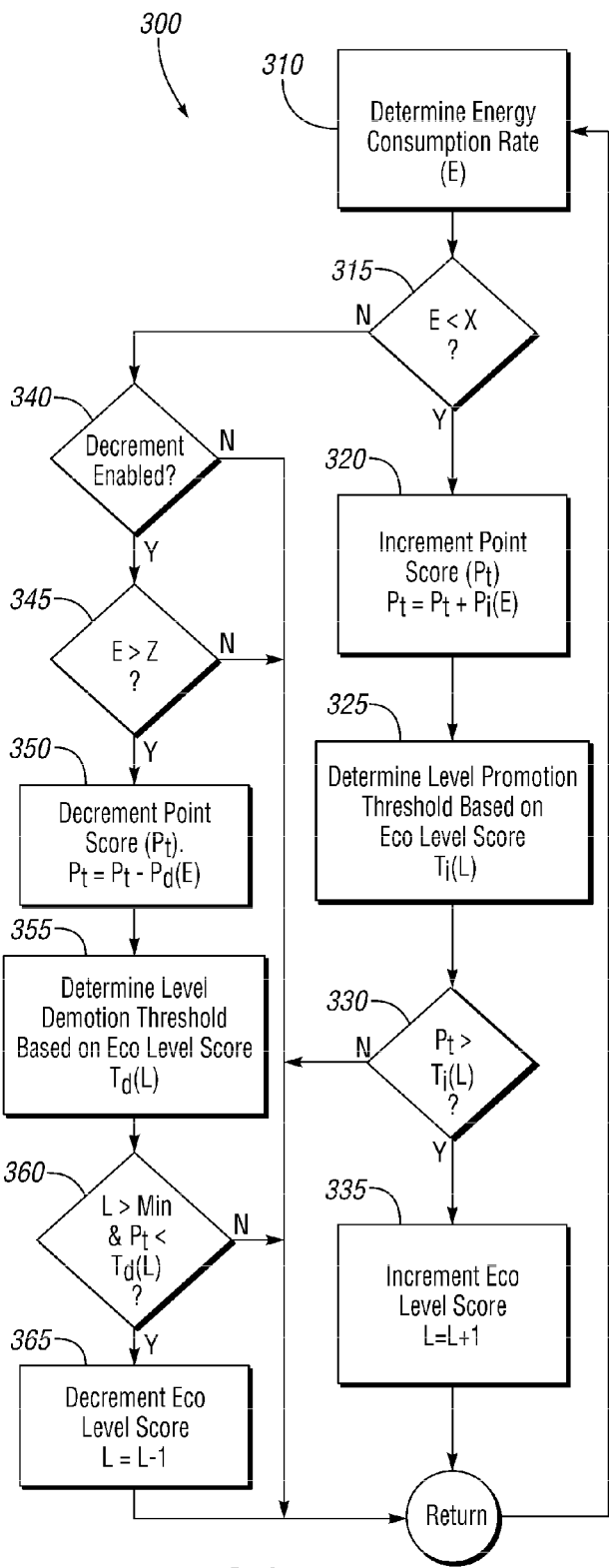
FIG. 3 is a simplified, exemplary flowchart depicting a method according to one or more embodiments of the present application.

FIG. 3 is a simplified, exemplary flowchart depicting a method 300 for determining the economy level score 80 according to one or more embodiments of the present application. At the outset, the operating efficiency of the vehicle 10 may generally be monitored. As a measure of the vehicle efficiency, an energy consumption rate, E, in terms of energy used per unit distance may be determined at step 310. The energy consumption rate (E) may be measured in watt-hours per kilometer (Wh/km), although other units may be employed as well.

As previously mentioned, the energy consumption rate (E) is used herein, for reference purposes, as a general indication of the operating efficiency of the vehicle 10. Thus, the more efficient the operation of the vehicle 10, the lower the energy consumption rate (E). Furthermore, the number of efficiency indicators 78 that may be displayed on the information display 66 may correspond to the current vehicle efficiency and, thus, may be inversely proportional to the current energy consumption rate (E). Although energy used per unit distance (i.e., energy consumption rate) is used herein as a general measure of vehicle efficiency, it is fully contemplated that other parameters may be used to monitor vehicle efficiency. This may even include parameters whose value increases the more efficiently the vehicle 10 is being operated.

According to one or more embodiments, achievements may be awarded based on a number of points accumulated for efficient driving or vehicle operation. For instance, each achievement level may have a corresponding point threshold that must be reached in order to graduate to the next achievement level. To this end, the information display system 64 may determine whether the energy consumption rate (E) is small enough to accumulate points towards an achievement level.

According to one or more embodiments, the information display system 64 may employ efficiency requirements that must be met in order to accrue points. For instance, the information display system 64 may compare the energy consumption rate (E) to a first efficiency threshold, X, as provided at step 315. If the energy consumption rate (E) is below the first efficiency threshold (X), the driver may accumulate points towards the next achievement level.

The number of accumulated points may be stored as a point score, $P_t$, using a point counter located in memory (not shown) of the controller 54. The memory may be non-volatile memory such as electrically erasable programmable read-only memory (EEPROM) or the like. Thus, the point score ($P_t$) may be incremented by a point score increment amount, $P_i$, if the efficiency value (E) is less than the first efficiency threshold (X), as provided at step 320.

Figure 4A:
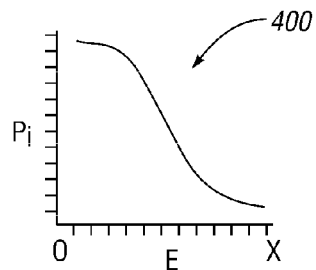
FIG. 4a is a graphical representation of an energy consumption rate versus a point score increment amount according to one or more embodiments of the present application.

According to one or more embodiments of the present application, the point score increment amount ($P_i$) may be based on the energy consumption rate (E). For instance, more points may be accumulated the smaller the energy consumption rate (E). Referring briefly to FIG. 4a, an exemplary graphical plot 400 of the energy consumption rate (E) versus the point score increment amount ($P_i$) is illustrated. As seen therein, the point score increment amount ($P_i$) may increase as the energy consumption rate (E) decreases. Further, the graphical plot 400 illustrates the first efficiency threshold (X) for earning points. While the point score increment amounts are represented graphically in FIG. 4a, it should be noted that information display system 64 may employ the use of a corresponding look-up table to determine the point score increment amount ($P_i$).

Referring back to FIG. 3, the information display system 64 may determine or otherwise lookup a level promotion threshold, $T_i$, associated with an achievement level, at step 325. For instance, the current level promotion threshold may correspond to the number of points that must be accumulated (i.e., the point score, $P_t$) to reach the next achievement level. According to one or more embodiments, the level promotion threshold ($T_i$) may vary based on the economy level score 80 (i.e., the current achievement level). Moreover, as the economy level score 80 increases, the difficulty to achieve the next level may increase. In other words, the amount of additional points that must be accumulated in order to increment the economy level score 80 may increase from one level to the next making the next achievement level increasingly difficult to reach. To this end, the economy level thresholds corresponding to the various achievement levels may be non-scalable.

Figure 4B:
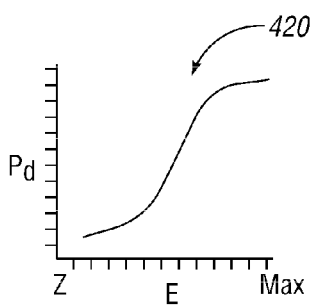
FIG. 4b is a graphical representation of an energy consumption rate versus a point score decrement amount according to one or more embodiments of the present application.
Figure 4C:
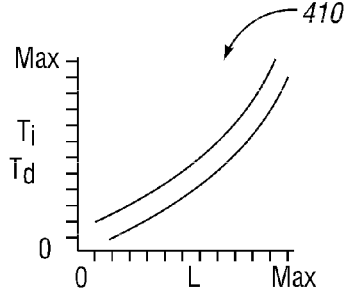
FIG. 4c is a graphical representation of an economy level score versus a level promotion threshold and a level demotion threshold according to one or more embodiments of the present application.

With brief reference now to FIG. 4c, an exemplary graphical plot 410 of the economy level score 80 (L) versus the level promotion threshold ($T_i$) is illustrated. As seen therein, the level promotion threshold ($T_i$) may increase with each increase in the economy level score 80 (i.e., each time a new achievement level is attained). While the level promotion thresholds are represented graphically in FIG. 4c, it should be noted that information display system 64 may employ the use of a corresponding look-up table to determine the level promotion threshold ($T_i$).

According to one or more embodiments, the economy level score 80 may be ascertained using input from the display control unit 68. For example, the display control unit 68 may retrieve the economy level score 80 from memory and may transmit a status signal (not shown) to the controller 54 indicating the economy level score currently displayed on the information display 66. The controller 54 may then lookup the corresponding level promotion threshold ($T_i$) in order to determine the number of points required to advance to the next achievement level.

At step 330, the information display system 64 may determine whether the current level promotion threshold ($T_i$) has been reached. If the number of points accumulated for efficient vehicle operation exceeds the current level promotion threshold, an achievement may be awarded along with advancement to the next achievement level. When this occurs, a command signal (not shown) may be transmitted to the display control unit 68 with instructions to increment the economy level score 80, as provided at step 335. Accordingly, the display control unit 68 may add an economy level indicator 78 to the information display 66. According to one or more embodiments, there may be a finite number of achievement levels. Correspondingly, the economy level score 80 may have a maximum value. To this end, the economy level score 80 may not be incremented if it is at its maximum value.

If the content being displayed when a promotion to the next achievement level occurs does not include the one or more economy level indicators 78, the information display 66 may temporarily or permanently transition to the efficiency screen 72 to show the addition of an economy level indicator 78. Additionally or alternatively, a message (not shown) may appear on the information display 66 alerting the driver to the achievement and/or informing the driver of the updated economy level score. The message may be a pop-up text message that appears temporarily in the foreground 88 of the information display 66, although other message formats are contemplated including audible alerts. Thereafter, the method 300 may return to step 310 where the information display system 64 continues to monitor the energy consumption rate.

Returning to step 330, if it is determined that the point score ($P_t$) is less than the level promotion threshold ($T_i$), the method 300 may then return immediately to step 310 and the process repeats.

Returning to step 315, the method 300 may instead proceed to step 340 if the energy consumption rate (E) is above the first efficiency threshold (X) for accumulating points. According to one or more embodiments of the present application, the information display system 64 may be configured to downgrade or decrement the economy level score 80 for relatively inefficient driving or vehicle operation as an additional measure of feedback. If present, the system's ability to demote a driver to a lesser achievement level may be disabled. Accordingly, at step 340, the information display system 64 may determine whether a feature that permits a demotion to a lesser achievement level is present and/or enabled.

If this feature is not enabled, the method 300 may return to step 310. If, on the other hand, achievement level demotion is possible or enabled, the information display system 64 may determine whether the energy consumption rate (E) is above a second efficiency threshold (Z) for losing points, as provided at step 345. In this regard, points may not be lost unless and until the energy consumption rate (E) increases above a certain level. Thus, the method 300 may return to step 310 if the energy consumption rate (E) is below the second efficiency threshold (Z). However, if the energy consumption rate (E) exceeds the second efficiency threshold (Z), a step 350 may occur.

At step 350, the point score ($P_t$) may be decremented by a point score decrement amount, $P_d$, if the energy consumption rate (E) exceeds the second efficiency threshold (Z). Similar to step 320, the point score decrement amount ($P_d$) may be based on the energy consumption rate (E). For instance, more points may be lost the higher the energy consumption rate (E). Referring briefly now to FIG. 4b, an exemplary graphical plot 420 of the energy consumption rate (E) versus the point score decrement amount ($P_d$) is illustrated. As seen therein, the point score decrement amount ($P_d$) may increase as the energy consumption rate (E) increases. Further, the graphical plot 420 illustrates the second efficiency threshold (Z) for losing points. While the point score decrement amounts are represented graphically in FIG. 4b, it should be noted that information display system 64 may employ the use of a corresponding look-up table to determine the point score decrement amount ($P_d$).

Referring back to FIG. 3, once the point score ($P_t$) is updated at step 350, the information display system 64 may determine or otherwise lookup a level demotion threshold, $T_d$, for decrementing the economy level score 80, as provided at step 355. Similar to the level promotion threshold ($T_i$), the level demotion threshold ($T_d$) may vary based on the economy level score 80. For instance, the level demotion threshold ($T_d$) may correspond to the point score ($P_t$) that the point counter must be reduced to in order for a demotion to a prior achievement level to occur. According to one or more embodiments, the level demotion threshold ($T_d$) in order to return to a prior achievement level may be lower than the level promotion threshold ($T_i$) applied to reach the current achievement level.

Referring back to FIG. 4c, the exemplary graphical plot 410 illustrating the economy level score 80 versus level promotion threshold ($T_i$) also illustrates the economy level score 80 versus the level demotion threshold ($T_d$). As seen therein, the point threshold to receive a demotion from an achievement level may be less that the point threshold for earning a promotion to that achievement level. While the level demotion thresholds are represented graphically in FIG. 4c, it should be noted that information display system 64 may employ the use of a corresponding look-up table to determine the level demotion threshold ($T_d$).

As previously described, the current economy level score 80 may be ascertained using input from the display control unit 68. For example, the display control unit 68 may transmit the status signal to the controller 54 indicating the economy level score currently displayed on the information display 66. The controller 54 may then lookup the corresponding level demotion threshold ($T_d$) in order to determine the point score ($P_t$) that results in a demotion to the previous achievement level.

At step 360, the information display system 64 may determine whether the current level demotion threshold ($T_d$) has been reached. Prior to doing so, the information display system 64 may first determine whether the current achievement level is at its minimum. If so, no further demotions may occur. For instance, the economy level score 80 may remain unchanged if it is already at zero. Otherwise, if the number of points lost for inefficient vehicle operation causes the point score ($P_t$) to drop below the current level demotion threshold ($T_d$), an achievement may be rescinded along with a demotion to the previous achievement level. When this occurs, the command signal may be transmitted to the display control unit 68 with instructions to decrement the economy level score 80, as provided at step 365. Accordingly, an economy level indicator 78 may be removed from the information display 66 or the information display 66 may be otherwise updated to reflect the change in the economy level score 80.

If the content being displayed when a demotion occurs does not include the economy level score 80, the information display 66 may temporarily or permanently transition to the efficiency screen 72 to show the deletion of an economy level indicator 78. Additionally or alternatively, a message (not shown) may appear on the information display 66 alerting the driver to the demotion and/or informing the driver of the updated economy level score 80. The message may be a pop-up text message that appears temporarily in the foreground 88 of the information display 66, although other message formats are contemplated including audible alerts. Thereafter, the method 300 may return to step 310 where the information display system 64 continues to monitor the energy consumption rate. Returning to step 360, if, on the other hand, it is determined that the point score ($P_t$) remains above the current level demotion threshold ($T_d$) or the economy level score 80 is at its minimum, the method 300 may then return immediately to step 310 and the process repeats.

It should be noted that the method of FIG. 3 as described herein is exemplary only, and that the functions or steps of the method could be undertaken other than in the order described and/or simultaneously as may be desired, permitted and/or possible.

According to one or more embodiments of the present application, the number of achievement levels attained or lost on a given drive cycle may be limited to one. However, it may be possible to earn an achievement level promotion, receive an achievement level demotion, and regain an achievement level within the same drive cycle. Thus, a change in value of the economy level score 80 reflected on the information display 66 may be no greater than one in either direction for any given trip.

Furthermore, an economy level score 80 may be associated with each driver of the vehicle 10. In this regard, if personalization is available on the vehicle 10, then an economy level score 80 may be associated with each driver profile. Once the vehicle 10 identifies a particular driver, information associated with the driver's economy level score may be retrieved from memory. A driver's identity may be ascertained in any number of ways, and can be accomplished either actively or passively. For instance, a driver may input a password or similar code as identification.

Alternatively, the identity of a driver can be ascertained by interrogating radio frequency (RF) data transmitted from a transponder located in a key. For example, various keys can be associated with a group of drivers of the vehicle 10. One or more keys may be tagged with an identification number and assigned to a particular driver. A passive anti-theft controller, passive entry passive start controller, or other suitable device may be generally configured to receive the RF data from the key and compare such data to known values to determine the driver's identity. In response to determining the identity of the driver, message signals indicating the identity of the driver can be transmitted over a communication data bus to other controllers/modules in the vehicle 10, such as the controller 54 or the display control unit 68, so that the identity of the driver is known.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. An information display system for a vehicle comprising:
   an information display for displaying an economy level score; and
   a controller in communication with the information display and configured to:
   determine a point score based on an energy consumption rate; and
   increment the economy level score upon a determination that the point score exceeds the level promotion threshold.

2. The information display system of claim 1, wherein the information display includes one or more economy level indicators corresponding to the economy level score, and the economy level score is displayed on the information display using the one or more economy level indicators.

3. The information display system of claim 2, wherein incrementing the economy level score comprises transmitting a command signal so that an additional economy level indicator is added to the information display.

4. The information display system of claim 1, wherein the controller determines the point score based on the energy consumption rate upon a determination that the energy consumption rate is less than a first efficiency threshold.

5. The information display system of claim 1, wherein the step of determining a point score based on an energy consumption rate comprises:
   determining a point score increment amount based on the energy consumption rate; and
   increasing the point score by the point score increment amount.

6. The information display system of claim 1, further comprising determining the level promotion threshold based on the economy level score.

7. The information display system of claim 6, wherein an amount of additional points necessary for the point score to exceed a next level promotion threshold is greater than the amount of additional points required for the point score to exceed a preceding level promotion threshold.

8. The information display system of claim 1, wherein display of the economy level score is hidden from a driver until the point score exceeds a first level promotion threshold.

9. The information display system of claim 1, wherein the economy level score is based on a number of level promotion thresholds exceeded over a life of the vehicle.

10. The information display system of claim 1, wherein the step of determining a point score based on an energy consumption rate comprises:
    determining whether the energy consumption rate exceeds a second efficiency threshold;
    determining a point score decrement amount based on the energy consumption rate upon a determination that the energy consumption rate exceeds the second efficiency threshold; and
    decreasing the point score by the point score decrement amount.

11. The information display system of claim 10, wherein the controller is further configured to:
    determine a level demotion threshold based on the economy level score;
    determine whether the point score drops below the level demotion threshold; and
    decrement the economy level score upon a determination that the point score dropped below the level demotion threshold.

12. An information display system for a vehicle comprising:
    an information display including a number of economy level indicators displayed in a non-linear pattern on the information display; and
    a controller in communication with the information display and configured to:
    receive an economy level score based on a long-term vehicle operating efficiency, wherein the number of economy level indicators is based on the economy level score;
    calculate an energy consumption rate;
    receive a point score based on the energy consumption rate;
    receive a level promotion threshold based on the economy level score; and transmit a command signal so that another economy level indicator is added to the information display upon a determination that the point score exceeds the level promotion threshold.

13. The information display system of claim 12, wherein display of the economy level score is hidden from a driver until the point score exceeds a first level promotion threshold.

14. The information display system of claim 12, wherein the controller comprises:
- a display control unit coupled to the information display for storing the economy level score; and
- a vehicle controller in communication with the display control unit, the vehicle controller configured to receive a status signal from the display control unit corresponding to the economy level score.

15. The information display system of claim 14, wherein the vehicle controller transmits the command signal to the display control unit to increment the economy level score upon the determination that the point score exceeds the level promotion threshold.

16. The information display system of claim 12, wherein the information display further comprises a number of efficiency indicators based on a short-term vehicle operating efficiency.

17. The information display system of claim 12, wherein the number of economy level indicators are displayed randomly on the information display.

18. The information display system of claim 12, wherein the number of economy level indicators are revealed on the information display according to a predetermined order.

19. An information display system for a vehicle comprising:
- an information display including one or more economy level indicators associated with an economy level score; and
- a controller in communication with the information display and configured to determine the economy level score based on a lifetime vehicle operating efficiency, calculate a point score based on an energy consumption rate, and increment the economy level score when the point score exceeds a level promotion threshold.

20. The information display system of claim 19, wherein the level promotion threshold is based on a current economy level score.

* * * * *